(12) United States Patent
Kim et al.

(10) Patent No.: US 11,178,194 B2
(45) Date of Patent: Nov. 16, 2021

(54) PACKET DATA UNIT SESSION ESTABLISHMENT METHOD AND NETWORK ENTITY PERFORMING THE SAME

(71) Applicant: ELECTRONICS AND TELECOMMUNICATIONS RESEARCH INSTITUTE, Daejeon (KR)

(72) Inventors: Changki Kim, Daejeon (KR); Yoo Hwa Kang, Daejeon (KR); Jeoung Lak Ha, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/277,302

(22) Filed: Feb. 15, 2019

(65) Prior Publication Data

US 2019/0260811 A1 Aug. 22, 2019

(30) Foreign Application Priority Data

Feb. 19, 2018 (KR) .................. 10-2018-0019454
Feb. 7, 2019 (KR) .................. 10-2019-0014556

(51) Int. Cl.
  *H04W 76/12* (2018.01)
  *H04L 29/06* (2006.01)
  *H04W 80/02* (2009.01)
  *H04W 76/15* (2018.01)

(52) U.S. Cl.
  CPC ...... *H04L 65/1069* (2013.01); *H04L 65/1083* (2013.01); *H04W 76/12* (2018.02); *H04W 76/15* (2018.02); *H04W 80/02* (2013.01)

(58) Field of Classification Search
  CPC ................................................ H04L 65/1069
  See application file for complete search history.

(56) References Cited

U.S. PATENT DOCUMENTS

| 2016/0014628 | A1  | 1/2016 | Kim |
| 2017/0086081 | A1  | 3/2017 | Kim et al. |
| 2018/0270715 | A1* | 9/2018 | Lee .................. H04W 36/0011 |
| 2019/0274178 | A1* | 9/2019 | Salkintzis ............. H04W 76/16 |

(Continued)

OTHER PUBLICATIONS

3GPP TR 23.793 V0.2.0 (Jan. 2018), "3rd Generation Partnership Project; Technical Specification Group Services and System Aspects; Study on Access Traffic Steering, Switching and Splitting support in the 5G system architecture (Release 16)", pp. 1-18.

(Continued)

*Primary Examiner* — Sulaiman Nooristany
(74) *Attorney, Agent, or Firm* — Rabin & Berdo, P.C.

(57) ABSTRACT

A packet data unit session establishment method and network entity performing the same is disclosed. User equipment (UE) may establish registration with the core network through a first access network when the UE is registered in a core network through a second access network belonging to the network and a first PDU session is established through the second access network. The UE may transmit a non-access stratum (NAS) message including a PDU session identifier (ID) that is the same as an ID of the first PDU session to an access and mobility management function (AMF).

6 Claims, 5 Drawing Sheets

(56) References Cited

U.S. PATENT DOCUMENTS

2019/0289666 A1* 9/2019 Backman .............. H04L 69/167
2020/0336937 A1* 10/2020 Youn .................... H04W 48/16

OTHER PUBLICATIONS

3GPP TS 23.502 V15.0.0 (Dec. 2017), "3rd Generation Partnership Project; Technical Specification Group Services and System Aspects; Procedures for the 5G System; Stage 2, (Release 15)", pp. 1-257.
Etri, "Updating 6.2 Solution 2 to support a Multi-Access PDU Session with a single PDU session ID", SA WG2 Meeting #127, S2-183690, Apr. 16-20, 2018, pp. 1-10.
LG Electronics, Motorola Mobility, Lenovo, "ATSSS Solution—Update of Solution 2", SA WG2 Meeting #127, S2-184118, Apr. 16-20, 2018, pp. 1-8.
3GPP TR 23.793 V1.1.0 (Oct. 2018), "3rd Generation Partnership Project; Technical Specification Group Services and System Aspects; Study on Access Traffic Steering, Switching and Splitting support in the 5G system architecture (Release 16)", pp. 1-108.
Changki Kim et al., "An Efficient Session Establishment for Access Traffic Distribution in the 5G Core Network", JCCI, May 2018, pp. 325-326. English Abstract.
3GPP TR 23.793 V16.0.0 (Dec. 2018), "3rd Generation Partnership Project; Technical Specification Group Services and System Aspects; Study on access traffic steering, switch and splitting support in the 5G system architecture (Release 16)", pp. 1-114.

* cited by examiner

PACKET DATA UNIT SESSION ESTABLISHMENT METHOD AND NETWORK ENTITY PERFORMING THE SAME

CROSS-REFERENCE TO RELATED APPLICATION

This application claims priority to and the benefit of Korean Patent Application Nos. 10-2018-0019454 and 10-2019-0014556 filed in the Korean Intellectual Property Office on Feb. 19, 2018 and Feb. 7, 2019, respectively, the entire contents of which are incorporated herein by reference.

BACKGROUND OF THE INVENTION (a) Field of the Invention

The present invention relates to packet data unit session establishment method and a network entity performing the same.

(b) Description of the Related Art

Recently, standardization of 5G network technology has been underway. In this 5G network, standard work is underway to support access traffic steering, switching, and splitting (ATSSS) between a 3GPP access network and a non-3GPP access network.

Traffic steering refers to an ability to deliver new data traffic through a new access network, and traffic switching refers to an ability to transfer all currently transmitted data traffic to another access network. Traffic splitting refers to an ability to distribute one set of data traffic through a plurality of access networks.

In order to provide traffic (data, voice, etc.) to user equipment (UE) in a 5G network, packet data unit (PDU) session establishment is required between the UE and a data network. Existing PDU session establishment is established only through the terminal and one access network (3GPP access network or non-3GPP access network), thereby establishing a single access PDU session (SA-PDU session). A plurality of SA-PDU sessions may be established in one UE, and the plurality of single access PDU sessions may be distinguished through PDU session identifiers, respectively.

However, since an existing SA-PDU session is established to only one access network, user traffic belonging to the corresponding PDU session can not be transmitted/received through two or more access networks. Accordingly, it is difficult to provide a service supporting the ATSSS function.

SUMMARY OF THE INVENTION

The present invention provides a PDU session establishment method for an ATSSS function and a network entity performing the same.

According to an exemplary embodiment of the present invention, a method for establishing a packet data unit (PDU) session in a network is provided. The method includes establishing, by user equipment (UE), registration with a core network through a first access network when the UE is registered in a core network through a second access network belonging to the network and a first PDU session is established through the second access network, and transmitting, by the UE, a non-access stratum (NAS) message including a PDU session identifier (ID) that is the same as an ID of the first PDU session to an access and mobility management function (AMF).

The NAS message may be a PDU session establishment request message.

The PDU session establishment request message may further include a request type indicating an existing PDU session and a multi-access (MA)-PDU request flag indicating an MA-PDU session.

The method may further include transmitting, by the AMF, a PDU session creation request message including information included in the NAS message to a session management function (SMF), and receiving, by the AMF, a response message for the PDU session creation request message from the SMF.

The method may further include transmitting, by the SMF, the MA-PDU request flag to a policy control function (PCF) so that the PCF performs a session management policy modification when the SMF receives the PDU session creation request message.

The method may further include receiving, by the AMF, a first message including a PDU session establishment accept message from the SMF.

The method may further include transmitting, by the AMF, a PDU session request message including the PDU session establishment accept message to the first access network, setting up, by the first access network, a radio resource with the UE, transmitting, by the first access network, the PDU session establishment accept message to the UE through the radio resource, and allocating, by the first access network, access network tunnel information and transmitting a PDU session request Ack message including the access network tunnel information to the AMF.

The method may further include transmitting, by the AMF, a PDU session update request message including the access network tunnel information to the SMF, and receiving, by the AMF, a response message for the PDU session update request message from the SMF.

According to another exemplary embodiment of the present invention, a method for establishing a packet data unit (PDU) session in a network is provided. The method may include registering user equipment (UE) through a first access network and a second access network belonging to the network, and transmitting, by the UE, a PDU session establishment request message to an access and mobility management function (AMF) through the first access network. The PDU session establishment request message may include a single PDU session identifier (ID), a request type indicating an initial PDU session, and a multi-access-PDU (MA-PDU) request indication indicating an MA-PDU session.

The method may further include transmitting, by the AMF, a PDU session creation request message including information included in the PDU session establishment request message to a session management function (SMF), and receiving, by the AMF, a response message for the PDU session creation request message from the SMF.

The method may further include transmitting, by the SMF, the MA-PDU request indication to a policy control function (PCF) so that the PCF performs MA-PDU session authorization when the SMF receives the PDU session creation request message.

The method may further include receiving, by the AMF, a first message including a PDU session establishment accept message from the SMF.

The method may further include transmitting, by the AMF, a PDU session request message to the second access network, setting up, by the second access network, a radio resource with the UE, and allocating, by the second access network, access network tunnel information and transmitting a PDU session request Ack message including the access network tunnel information to the AMF.

The method may further include transmitting, by the AMF, a PDU session update request message including the access network tunnel information to the SMF, and receiving, by the AMF, a response message for the PDU session update request from the SMF.

The method may further include transmitting, by the AMF, a PDU session request message including the PDU session establishment accept message to the first access network, setting up, by the first access network, a radio resource with the UE, transmitting, by the first access network, the PDU session establishment accept message to the UE through the radio resource, and allocating, by the first access network, access network tunnel information and transmitting a PDU session request Ack message including the access network tunnel information to the AMF.

The method may further include transmitting, by the AMF, a PDU session update request message including the access network tunnel information to the SMF, and receiving, by the AMF, a response message for the PDU session update request message from the SMF.

The method may further include transmitting, by the second access network, the PDU session establishment accept message to the UE through the radio resource.

According to another exemplary embodiment of the present invention, a first network entity for controlling a packet data unit (PDU) session for user equipment (UE) in a network is provided. The first network entity may include a processor controlling the UE to register with first and second access networks belonging to the network and controlling the UE to establish a first PDU session through the first access network, and a network interface receiving a PDU session establishment request message from the UE. The PDU session establishment request message may include a PDU session identifier (ID) that is the same as an ID of the first PDU session, a request type indicating an existing PDU session, and a multi access (MA)-PDU request flag indicating an MA-PDU session.

The processor may control to transmit a PDU session creation request message including information included in the PDU session establishment request message to a second network entity and to receive a response message for the PDU session creation request message from the second network entity, and the processor may update the first PDU session to a multi-access PDU session.

The first network entity may be an access and mobility management function (AMF) and the second network entity may be a session management function.

According to an exemplary embodiment of the present invention, by establishing a multi-access PDU session, the ATSSS function can be provided.

DETAILED DESCRIPTION OF THE EMBODIMENTS

Figure 1:
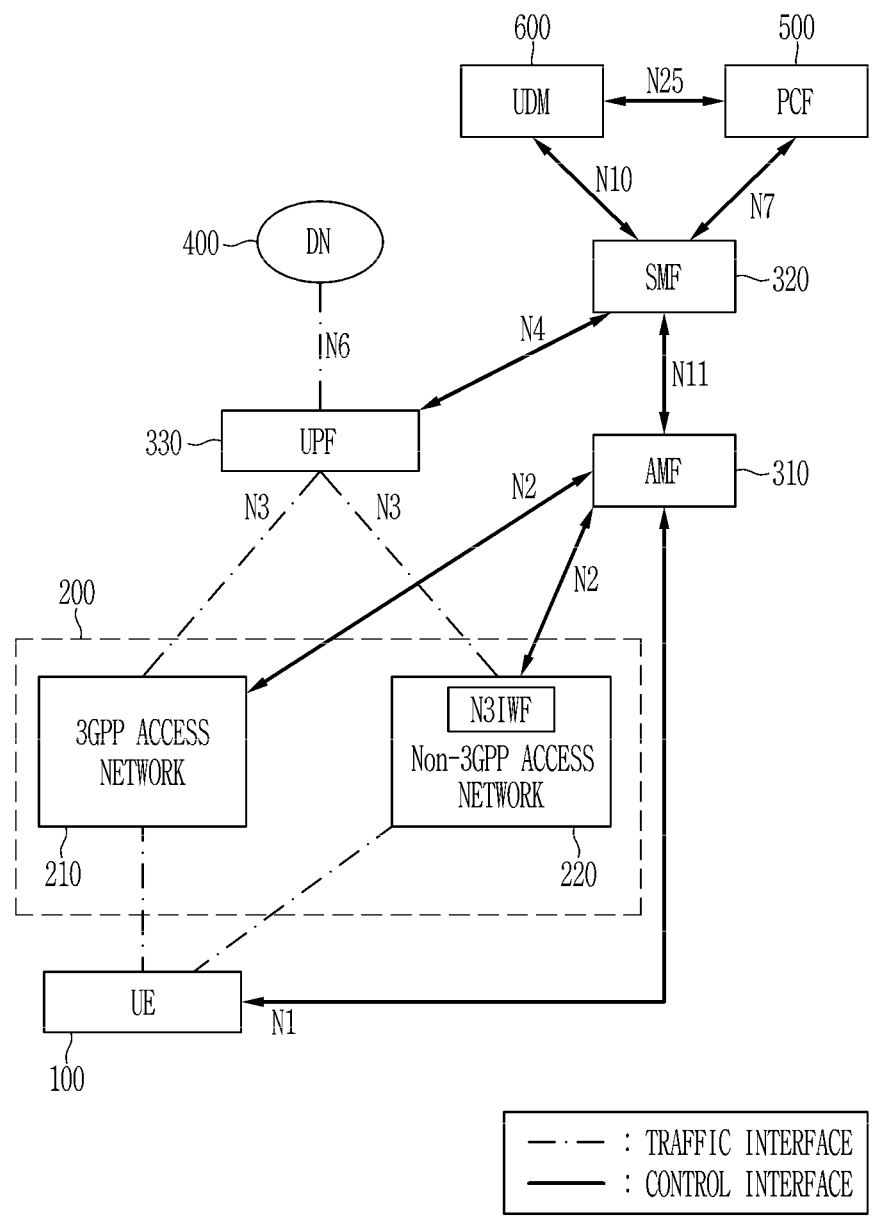
FIG. 1 is a diagram showing a 5G network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Throughout the present specification, user equipment (UE) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), or the like, and may include all or some of the functions of the terminal, the MT, the AMS, the HR-MS, the SS, the PSS, the AT, or the like. In addition, a base station (BS) may indicate an advanced base station (ABS), a high reliability base station (HR-BS), a nodeB, an evolved nodeB (eNodeB), a base transceiver station (BTS), a mobile multihop relay (MMR)-BS, a relay station (RS) serving as a base station, a high reliability relay station (HR-RS) serving as a base station, and the like, and may include all or some of the functions of the base station, the ABS, the nodeB, the eNodeB, the BTS, the MMR-BS, the RS, the HR-RS, and the like.

FIG. 1 is a diagram showing a 5G network according to an exemplary embodiment of the present invention.

As shown in FIG. 1, a 5G network 1000 according to an exemplary embodiment of the present invention includes UE 100, an access network (AN) 200, an access and mobility management function (AMF) 310, a session management function (SMF) 320, a user plane function (UPF) 330, a data network (DN) 400, a policy control function (PCF) 500, and a unified data management (UDM) 600.

The UE 100 may access a network through the AN 200. The AN 200 includes a 3GPP access network 210 and a non-3GPP access network 220. The UE 100 may access a cellular mobile radio access network via the 3GPP access network 210. The UE 100 may access a wireless LAN access network via the 3GPP access network 210. The non-3GPP access network 220 includes a non-3GPP interworking function (N3IWF) for the N3 and N2 interfaces with the UPF 330 and the AMF 310 by a 5G core network common interface principle.

The AMF 310 and the SMF 320 are network entities that process control signals. The AMF 310 performs authentication, connection, and mobility control functions. The SMF 320 has a session control function (configuring/changing/releasing a session), and performs a signaling procedure for traffic path configuration and traffic mobility management. That is, the SMF 320 controls a data path between the UPF 330 and the AN 200. The AMF 310 has a non-access stratum (NAS) signal interface N1 together with the UE 100.

The UPF 330 is a network entity of a data plane that integrally accommodates the multiple access networks 210 and 220 via an N3 interface. The UPF 330 connects a data plane between the multiple access networks 210 and 220 and the DN 400 so that traffic of the UE 100 (i.e., the user) can be transmitted and received.

The UPF 330 and the access network 200 receive a control rules for traffic between the UE 100 and the UPF 330 via an N4 and N2 interface from the SMF 320, respectively, and perform functions such as traffic detection, routing, and QoS control through the received control rules.

The PCF 500 is connected to the SMF 320 through an N7 signal interface, and controls policies related to session, mobility, and QoS. The PCF 320 may transmit a policy and charging control rule (PCC) policy required for the SMF 320 to generate the ATSSS rule to the SMF 320.

The UDM 600 is connected to the SMF 320 through an N10 signal interface, and manages user information management and policy for each UE such as subscription information of the UE 100. The UDM 600 may transmit information about the profile and subscription of the UE 100 to the SMF 320 for ATSSS.

As described above, the 5G network system according to an exemplary embodiment of the present invention is an integrated structure that simultaneously accommodates the 3GPP access network 210 and the non-3GPP access network 220. In order to provide the ATSSS function in such an integrated structure, a procedure of establishing a multi-access PDU session (MA-PDU session) is required. In particular, the MA-PDU session establishment is required in which the UE 100 can transmit/receive user traffic through two or more access networks. Hereinafter, the MA-PDU session establishment will be described with reference to FIG. 2 to FIG. 4.

Figure 2:
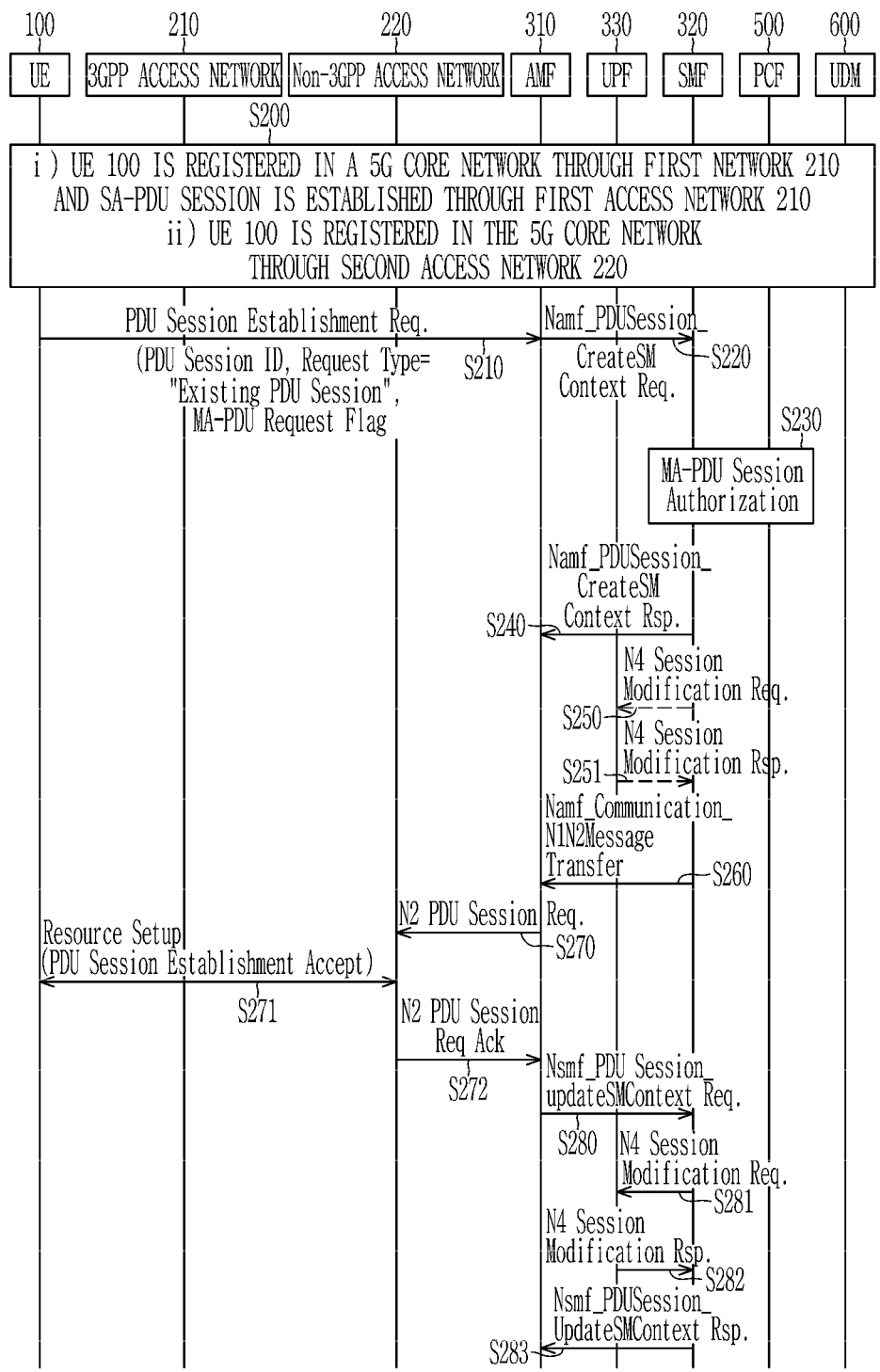
FIG. 2 is a flowchart showing a method for establishing a multi-access PDU session according to an exemplary embodiment of the present invention.

FIG. 2 is a flowchart showing a method for establishing a multi-access PDU session (MA-PDU session) according to an exemplary embodiment of the present invention.

First, it is assumed in FIG. 2 that the UE 100 is registered in a 5G core network through the first access network 210, and a single access PDU session (hereinafter referred to as 'SA-PDU session') is established through the first access network 210 (S200). That is, the UE 100 is in a state of being registered in the 5G network through the first access network 210 and the UE 100 is in a state where the SA-PDU session is established through the first access network 210. Then, the UE 100 is registered in the 5G core network through the second access network 220. For the sake of explanation, it is assumed in FIG. 2 that the SA PDU session is established through the first access network 210. Upon establishment of the single access (SA) PDU session, the UE 100 transmits a PDU session establishment request message, which includes a PDU session identifier (ID). A method of establishing the SA PDU session will be apparent to those skilled in the art and will not be described in detail.

Meanwhile, it is assumed in FIG. 2 that the first access network 210 is the 3GPP access network and the second access network 220 is the non-3GPP access network.

In order to extend the SA-PDU session to the MA-PDU session, the UE 100 transmits a PDU session establishment request message to the AMF 310 (S210). Since the N2 interface is formed between the UE 100 and the AMF 310 through a non-access stratum (NAS) signaling procedure, the UE 100 can transmit the PDU session establishment request message to the AMF 310.

Here, the PDU session establishment request message may be one of NAS signaling messages. The PDU session establishment request message includes a PDU session ID, a request type, and a multi-access PDU (MA-PDU) request flag. The PDU session ID included in the PDU session establishment request message is the same as the PDU session ID allocated in step S200. That is, the PDU session ID included in the PDU session establishment request message transmitted to establish the MA-PDU session is the same as the PDU session ID included in the PDU session establishment request message transmitted to establish the SA-PDU session. The request type indicates that the request is for an initial or an existing PDU session, and is set as the existing PDU session because it is an extension for the existing PDU session. On the other hand, the MA-PDU request flag indicates a multi-access PDU session (MA-PDU session), and may include at least one of an access type (for example, 3GPP access network or Non-3GPP access network) and a radio access technology (RAT) type. Here, the MA-PDU request flag can be used in combination with the term 'multi-access (MA) information'.

When the AMF 310 receives the PDU session establishment request message in step S210, the AMF 310 transmits the information included in the PDU session establishment request message to the SMF 320 by including it in a Namf_PDUSession_createSMContext request message (S220). That is, the Namf_PDUSession_createSMContext request message includes the PDU session ID, the request type, and the MA-PDU request flag received in step S210. Here, the AMF 310 updates the access type of the PDU session established in step S200 to multi-access.

When the SMF 320 receives the Namf_PDUSession_createSMContext message in step S220, the SMF 320 performs an MA-PDU session authorization procedure with the PCF 500 (S230). That is, the SMF 320 performs an authorization procedure, which indicates whether the existing SA PDU session can be extended to the MA-PDU session and what the available range is, in cooperation with the PCF 500. In more detail, the SMF 320 transmits access information related to the MA-PDU session request flag to the PCF 500, and the PCF 500 performs a session management policy modification procedure. The PCF 500 then decides that the requested PDU session can be added to the existing PDU session based on an operator policy and subscription.

When step S230 is completed, the SMF 320 transmits a Namf_PDUSession_createSMContext response message to the AMF 310 (S240). Then, the SMF 320 transmits an N4 session modification request message to the UPF 330 through the N4 interface (S250). Here, the N4 session modification request message includes an IP address and the MA information for extending the existing SA-PDU session to the MA-PDU session. The SMF 320 receives an N4 session modification response message from the UPF 330 in response to the N4 session modification request (S251).

The SMF 320 transmits a Namf_Communication_N1N2MessageTransfer message to the AMF 310 (S260). The Namf_Communication_N1N2MessageTransfer message may include the PDU session ID (same as the SA-PDU session ID), the request type, and the MA-PDU request flag included in the PDU session establishment request message. The Namf_Communication_N1N2MessageTransfer message includes a PDU session establishment accept message, which is an N1 NAS message that the SMF 320 wants to deliver to the UE 100.

The AMF 310 transmits an N2 PDU session request message to the second access network (i.e., non-3GPP access network) 220 (S270). Here, the N2 PDU session request message includes an N1 NAS message (PDU session establishment accept message). The second access network 220 establishes a radio resource with the UE 100, and transmits a PDU session establishment accept message to the UE 100 through the established radio resource as an N1 NAS signaling message (S271).

The second access network 220 allocates access network (AN) tunnel information for establishing an N3 tunnel, and transmits an N2 PDU session request Ack message including the allocated AN tunnel information to the AMF 310 (S272).

The AMF 310 transmits an Nsmf_PDUSession_UpdateSMContext request message including the received AN tunnel information to the SMF 320 (S280).

The SMF 320 transmits an N4 session modification request message including the AN tunnel information and multi-access (MA) information received from the AMF 310 to the UPF 330 (S281), and receives an N4 session modification response message from the UPF 330 (S282).

The SMF 320 transmits an Nsmf_PDUSession_UpdateSMContext response message to the AMF 310 in response to the Nsmf_PDUSession_UpdateSMContext request message received in step S280 (S283).

Through the procedure of FIG. 2, the exemplary embodiment of the present invention can form an MA-PDU session for one PDU session ID, and can provide the ATSSS function through the formed MA-PDU session.

Figure 3:
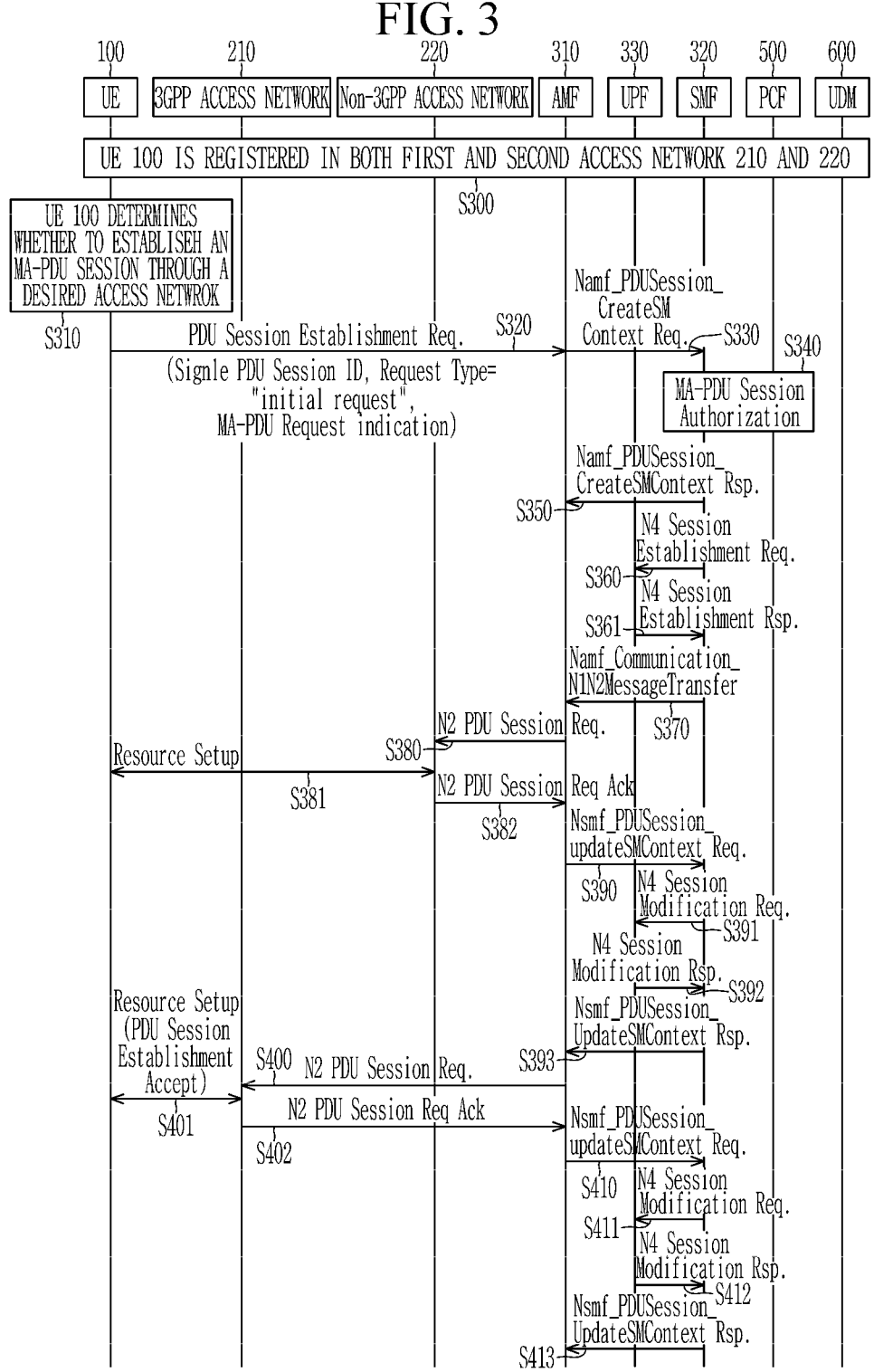
FIG. 3 is a flowchart showing a method for establishing a multi-access PDU session according to another exemplary embodiment of the present invention.

FIG. 3 is a flowchart showing a method for establishing a multi-access PDU session according to another exemplary embodiment of the present invention.

First, it is assumed in FIG. 3 that the UE 100 is registered in both the first and second access networks 210 and 220 (S300). That is, the UE 100 is registered in the 5G network through the first access network 210 and the second access network 220. A PDU session is not established in both the first access network and the second access network.

The UE 100 determines whether to establish an MA-PDU session through a desired access network (S310). The terminal 100 may determine to establish an MA-PDU session through the desired access according to an application or policy. For the sake of explanation, it is assumed in FIG. 3 that an MA-PDU session is established through the first access network 210 (3GPP access network).

The UE 100 transmits a PDU session establishment request message, which is an N1 NAS signaling message, to the AMF 310 through the first access network 210 (S320).

The PDU session establishment request message includes a single PDU session ID, a request type, and an MA-PDU request indication. The single PDU session ID is a PDU session ID for an MA-PDU session, which is a single ID commonly used in an MA-PDU session. The request type indicates that the request is for an initial or an existing PDU session, and is set as the initial PDU session because it is for establishing a new PA-PDU session. The MA-PDU request indication indicates that the request is an MA-PDU session. Here, the MA-PDU request indication can be used in combination with the term 'multi-access (MA) information'. Through the MA-PDU request indication and the request type set in the initial PDU session, it can be seen that the PDU session establishment request is to establish an MA-PDU session using an integrated establishment procedure.

When the AMF 310 receives the PDU session establishment request message in step S310, the AMF 310 transmits the information included in the PDU session establishment request message to the SMF 320 by including it in a Namf_PDUSession_createSMContext request message (S330). That is, the Namf_PDUSession_createSMContext request message includes the single PDU session ID, the request type, and the MA-PDU request indication received in step S320.

When the SMF 320 receives the Namf_PDUSession_createSMContext message in step S330, the SMF 320 performs an MA-PDU session authorization procedure with the PCF 500 (S340). That is, the SMF 320 performs an authorization procedure, which indicates whether the MA-PDU session can be established and what the available range is, in cooperation with the PCF 500.

When step S340 is completed, the SMF 320 transmits a Namf_PDUSession_createSMContext response message to the AMF 310 (S350). Then, the SMF 320 transmits an N4 session establishment request message to the UPF 330 through the N4 interface (S360). Here, the N4 session establishment request message includes an IP address and the MA information of the UE 100 in order to request an N3 interface tunnel establishment and the like. The SMF 320 receives an N4 session establishment response message from the UPF 330 in response to the N4 session establishment request (S361).

The SMF 320 transmits a Namf_Communication_N1N2MessageTransfer message to the AMF 310 (S370). The Namf_Communication_N1N2MessageTransfer message may include the PDU session ID, the request type, and the MA-PDU request indication included in the PDU session establishment request message. The Namf_Communication_N1N2MessageTransfer message further includes a PDU session establishment accept message, which is an N1 NAS message that the SMF 320 wants to deliver to the UE 100.

The AMF 310 transmits an N2 PDU session request message to the second access network (i.e., a non-3GPP access network) 220 that has not received the N1 NAS message in step S320 (S380). The second access network 220 sets up a radio resource with the UE 100 (S381). At this time, the second access network 220 does not transmit a PDU session establishment accept message, which is an N1 NAS signaling message, to the UE 100.

The second access network 220 allocates access network (AN) tunnel information for establishing an N3 tunnel, and transmits an N2 PDU session request Ack message including the allocated AN tunnel information to the AMF 310 (S382).

The AMF 310 transmits an Nsmf_PDUSession_UpdateSMContext request message including the received AN tunnel information to the SMF 320 (S390).

The SMF 320 transmits an N4 session modification request message including the AN tunnel information and multi-access (MA) information received from the AMF 310 to the UPF 330 (S391), and receives an N4 session modification response message from the UPF 330 (S392).

The SMF 320 transmits an Nsmf_PDUSession_UpdateSMContext response message to the AMF 310 in response to the Nsmf_PDUSession_UpdateSMContext request message received in step S390 (S393).

Meanwhile, after the radio resource setup in steps S380, S381, and S382 is completed with the second access network 220 that has not received the N1 NAS message, the AMF 310 recognizes that only one access network is established in spite of the fact that the corresponding PDU session is an MA-PDU session separately from steps S390 to S393. At this time, the AMF 310 transmits an N2 PDU session request message including the N1 NAS message (i.e., a PDU session establishment accept message) and the MA-PDU request indication (i.e. MA information) received in step S370 to the access network (i.e. the first access network 210) that has received the N1 NAS message (i.e. PDU session establishment request) in step S320 (S400).

When receiving the N2 PDU session request message in step S400, the first access network 210 sets up a radio resource with the UE 100 and transmits an N1 NAS signaling message (PDU session establishment accept message) to the UE 100 through the setup radio resource (S401).

The first access network 210 allocates access network (AN) tunnel information for establishing an N3 tunnel, and transmits an N2 PDU session request Ack message including the allocated AN tunnel information to the AMF 310 (S402).

The AMF 310 transmits an Nsmf_PDUSession_UpdateSMContext request message including the received AN tunnel information to the SMF 320 (S410).

The SMF 320 transmits an N4 session modification request message including the AN tunnel information and multi-access (MA) information received from the AMF 310 to the UPF 330 (S411), and receives an N4 session modification response message from the UPF 330 (S412).

The SMF 320 transmits an Nsmf_PDUSession_UpdateSMContext response message to the AMF 310 in response to the Nsmf_PDUSession_UpdateSMContext request message received in step S410 (S413).

Through such an integrated procedure of FIG. 3, an exemplary embodiment of the present invention may form an MA-PDU session in parallel and provide the ATSSS function through the formed MA-PDU session.

Figure 4:
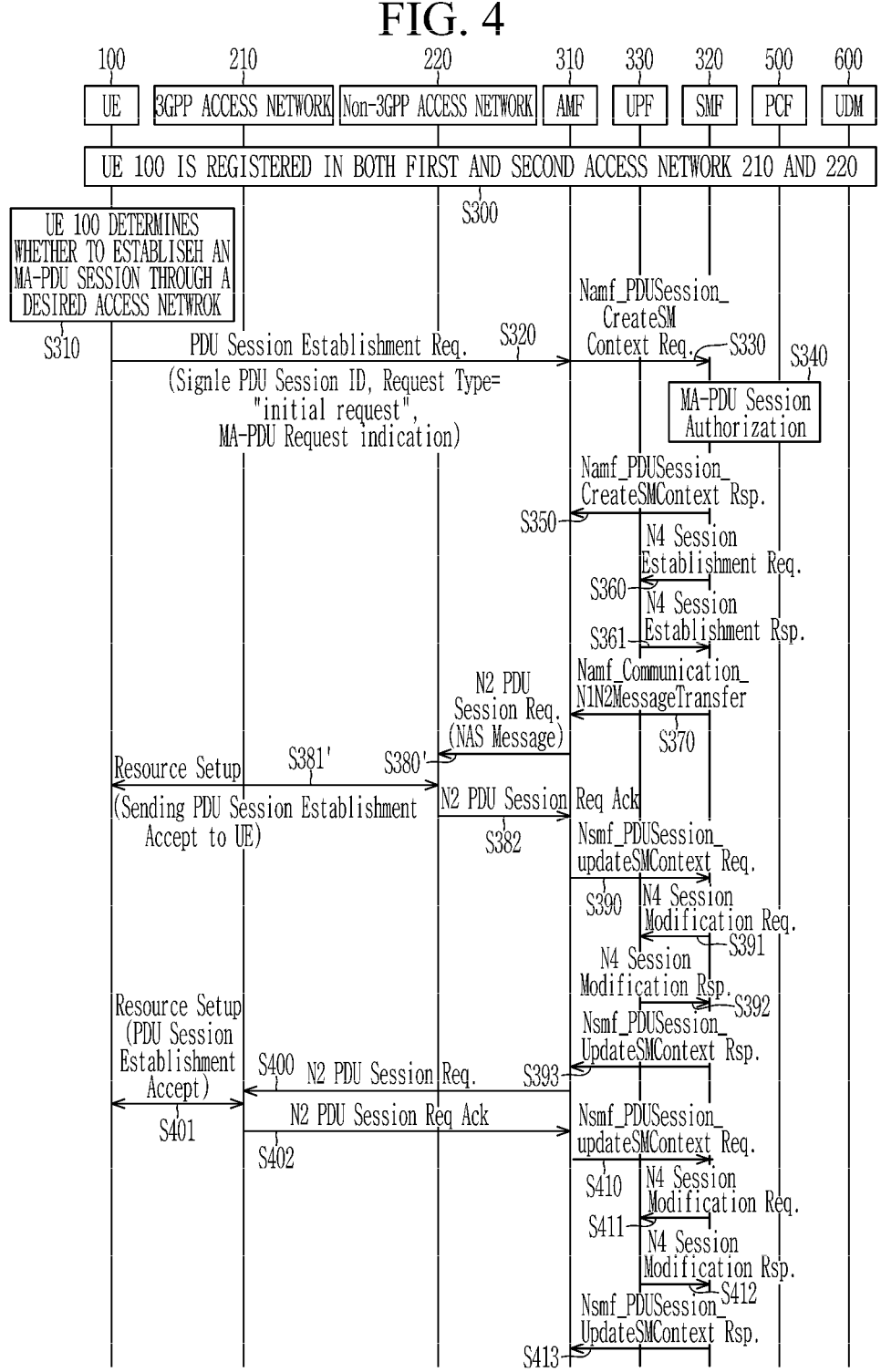
FIG. 4 is a flowchart showing a method for establishing a multi-access PDU session according to another exemplary embodiment of the present invention.

FIG. 4 is a flowchart showing a method for establishing a multi-access PDU session according to another exemplary embodiment of the present invention.

The MA-PDU session establishment method of FIG. 4 is the same as the procedure of FIG. 3 except that the N1 NAS message (PDU session establishment accept message) is transmitted to the UE 100 through the first access network 210. That is, the procedure of FIG. 3 is the same as the procedure of FIG. 4 except that the steps S380 and S381 of FIG. 3 are changed to steps S380' and S381' of FIG. 4, so duplicate explanations are omitted. The MA-PDU session establishment method of FIG. 4 transmits a PDU session establishment accept message to the UE 100 through each access network.

Figure 5:
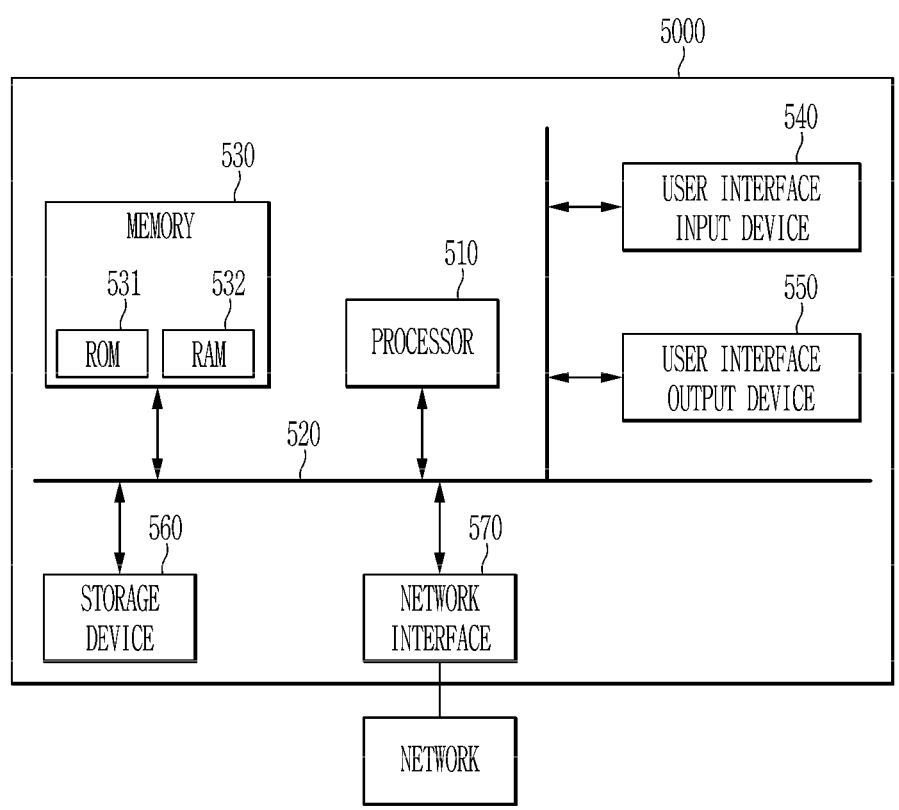
FIG. 5 is a diagram showing a computing system according to an exemplary embodiment of the present invention.

The AMF 310 transmits an N2 PDU session request message to the second access network (i.e., a non-3GPP access network) 220 that has not received the N1 NAS message in step S320 (S380'). Here, the N2 PDU session request message includes an N1 NAS message (PDU session establishment accept message). The second access network 220 establishes a radio resource with the UE 100, and transmits a PDU session establishment accept message to the UE 100 through the established radio resource as an N1 NAS signaling message (S381'). FIG. 5 is a diagram showing a computing system according to an exemplary embodiment of the present invention.

The computer system 5000 of FIG. 5 may be the AMF 310, the SMF 320, the UPF 330, the DN 400, the PCF 500, or the UDM 600 of FIG. 1. The UE 100, the access network 200, the AMF 310, the SMF 320, the UPF 330, the DN 400, the PCF 500, or the UDM 600 may be implemented as a computer system, for example, a computer readable medium.

The computer system 5000 includes at least one of a processor 510, a memory 530, a user interface input device 540, a user interface output device 550, and a storage device 560, that communicate via a bus 520. The computer system 5000 may also include a network interface 570 coupled to a network. The network interface 570 may transmit or receive signals with other entities over the network.

The processor 510 may be a central processing (CPU) or a semiconductor device that executes instructions stored in the memory 530 or the storage device 560. The processor 510 may be configured to implement the functions and methods described in FIG. 1 to FIG. 4.

The memory 530 and the storage device 560 may include various forms of volatile or non-volatile storage media. For example, the memory 530 may include a read only memory (ROM) 531 and a random access memory (RAM) 532. In an exemplary embodiment of the present invention, the memory 530 may be located inside or outside the processor 510, and the memory 530 may be coupled to the processor 510 through various already-known means.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of an access and mobility management function (AMF) for establishing a multi-access packet data unit (MA-PDU) session in a network, the method comprising:
   performing, by the AMF, an establishment of a first PDU session with a first PDU session identifier (ID) when a user equipment (UE) is registered in the AMF through only one access network between a first access network and a second access network, wherein the first PDU session is established through the one access network;
   receiving, by the AMF, from the UE, a non-access stratum (NAS) message containing PDU session establishment request information in order to extend the first PDU session to the MA-PDU session when the UE is registered in the AMF through both the first access network and the second access network;
   transmitting, by the AMF, a PDU session creation request message including the PDU session establishment request information to a session management function (SMF); and
   receiving, by the AMF, a response message for the PDU session creation request message from the SMF,
   wherein the PDU session establishment request information includes a PDU session ID which is the same as the first PDU session ID and includes MA-PDU request information indicating the MA-PDU session.

2. The method of claim 1, wherein
   the NAS message is a PDU session establishment request message.

3. The method of claim 1, further comprising
   transmitting, by the SMF, the MA-PDU request information to a policy control function (PCF) so that the PCF performs a session management policy modification when the SMF receives the PDU session creation request message.

4. The method of claim 1, further comprising
   receiving a first message including a PDU session establishment accept message from the SMF.

5. The method of claim 4, further comprising:
   transmitting a PDU session request message including the PDU session establishment accept message to the second access network;
   setting up, by the second access network, a radio resource with the UE;
   transmitting, by the second access network, the PDU session establishment accept message to the UE through the radio resource; and
   allocating, by the second access network, access network tunnel information and transmitting a PDU session request Ack message including the access network tunnel information to the AMF.

6. The method of claim 5, further comprising:
transmitting a PDU session update request message including the access network tunnel information to the SMF; and
receiving a response message for the PDU session update request message from the SMF.

\* \* \* \* \*